US007533215B2

United States Patent
Faber

(10) Patent No.: US 7,533,215 B2
(45) Date of Patent: May 12, 2009

(54) DISTRIBUTED AND PACKED METADATA STRUCTURE FOR DISK CACHE

(75) Inventor: Robert W. Faber, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 262 days.

(21) Appl. No.: 11/229,128

(22) Filed: Sep. 15, 2005

(65) Prior Publication Data

US 2007/0061511 A1 Mar. 15, 2007

(51) Int. Cl.
*G06F 12/00* (2006.01)
(52) U.S. Cl. .............. 711/103; 711/100; 711/102; 711/111; 711/112; 711/113; 711/114; 707/1; 707/100; 707/102; 713/1; 713/2
(58) Field of Classification Search ............. 711/100, 711/102–103, 111–114; 707/1, 100, 102; 713/1, 2
See application file for complete search history.

(56) References Cited

U.S. PATENT DOCUMENTS 5,724,501 A * 3/1998 Dewey et al. ............... 714/9
2002/0062422 A1* 5/2002 Butterworth et al. ........ 711/114
2003/0005219 A1* 1/2003 Royer et al. ................. 711/113
2003/0005223 A1 1/2003 Coulson et al.
2003/0046493 A1 3/2003 Coulson et al.
2004/0128470 A1* 7/2004 Hetzler et al. ............... 711/209
2005/0125614 A1* 6/2005 Royer, Jr. ..................... 711/137
2005/0193164 A1 9/2005 Royer et al.
2005/0193230 A1* 9/2005 Springer et al. ................ 714/5
2006/0106971 A1* 5/2006 Mahar et al. ................. 711/100
2006/0215437 A1* 9/2006 Trika et al. ................... 365/145

* cited by examiner

*Primary Examiner*—Tuan V Thai
*Assistant Examiner*—Zhuo H Li
(74) *Attorney, Agent, or Firm*—Trop, Pruner & Hu, P.C.

(57) ABSTRACT

An apparatus and method to reduce the initialization time of a system is disclosed. In one embodiment, upon a cache line update, metadata associated with the cache line is stored in a distributed format in non-volatile memory with its associated cache line. Upon indication of an expected shut down, metadata is copied from volatile memory and stored in non-volatile memory in a packed format. In the packed format, multiple metadata associated with multiple cache lines are stored together in, for example, a single memory block. Thus, upon system power up, if the system was shut down in an expected manner, metadata may be restored in volatile memory from the metadata stored in the packed format, with a significantly reduced boot time over restoring metadata from the metadata stored in the distributed format.

25 Claims, 4 Drawing Sheets

DISTRIBUTED AND PACKED METADATA STRUCTURE FOR DISK CACHE

BACKGROUND

Description of Related Art

The use of a cache in a computer reduces memory access time and increases the overall speed of a device. Typically, a cache is an area of memory which serves as a temporary storage area for a device and has a shorter access time than the device it is caching. Data frequently accessed by the processor remain in the cache after an initial access. Subsequent accesses to the same data may be made to the cache.

Two types of caching are commonly used, memory caching and disk caching. A memory cache, sometimes known as cache store, is typically a high-speed memory device such as a static random access memory (SRAM). Memory caching is effective because most programs access the same data or instructions repeatedly.

Disk caching works under the same principle as memory caching but uses a cheaper conventional memory device such as a dynamic random access memory (DRAM). A cheaper memory device is used because disk caches are often significantly larger than memory caches. The most recently accessed data from the disk is stored in the disk cache. When a program needs to access the data from the disk, the disk cache is first checked to see if the data is in the disk cache. Disk caching can significantly improve the performance of applications because accessing a byte of data in RAM can be thousands of times faster than accessing a byte on a disk.

Both the SRAM and DRAM are volatile. Therefore, in systems using a volatile memory as the cache memory, data stored in the cache memory would be lost when the power is shut off to the system. Accordingly, some existing devices may have a battery backup to 'emulate' the behavior of a non-volatile cache by not letting the device go un-powered. However, using an emulated cache increases the cost and reduces the reliability of the device, thereby making it unattractive to users.

In other devices, data is moved from the cache to a non-volatile storage device to preserve the cache data through a system shutdown or power failure. However, in order to use the data that has been stored on the non-volatile storage device, the state of the cache, referred to as metadata, needs to be preserved. If the state is not preserved, the system still needs to re-initialize the cache because the state of data currently in the cache is unknown.

Although the cache initialization time during system boot is not long in smaller caches (tens of megabytes), the initialization time for a cache in the Gigabyte range can be extremely long from a user's perspective. There is a need to find ways to reduce system boot time.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

As disclosed herein, a "cache" refers to a temporary storage area and can be either a memory cache or a disk cache. The term "system boot" refers to initialization of a computer or other system both when the power is first turned on, known as cold booting, and when a system is restarted, known as warm booting. The term "computer readable medium" includes, but is not limited to portable or fixed storage devices, optical storage devices, and any other memory devices capable of storing computer instructions and/or data. The term "computer instructions" are software or firmware including data, codes, and programs that can be read and/or executed to perform certain tasks.

Figure 1:
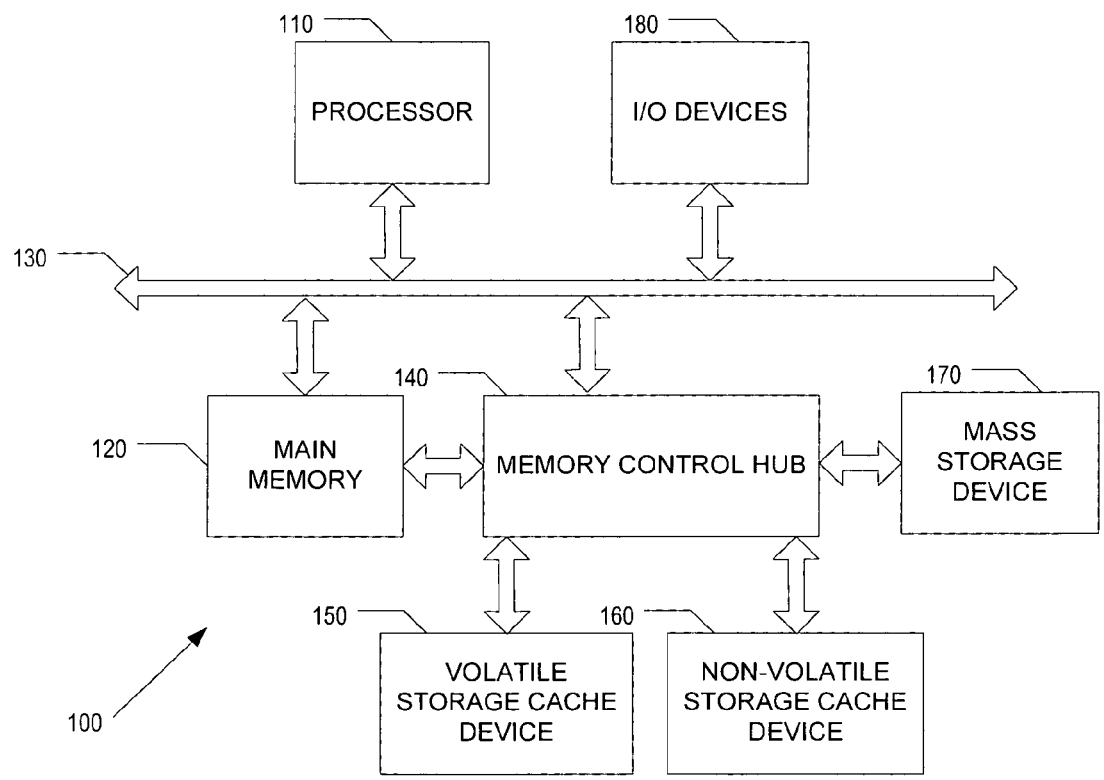
FIG. 1 illustrates a system according to an embodiment of the invention.

FIG. 1 illustrates a system 100 according to an embodiment of the present invention. System 100 includes a processor 110 coupled to a main memory 120 by a bus 130. Main memory 110 may include a volatile random-access-memory (RAM) and be coupled to a memory control hub 140. Memory control hub 140 may also be coupled to bus 130, to a volatile storage cache device 150, a non-volatile storage cache device 160 and to a mass storage device 170. Mass storage device 170 may be a hard disk drive, a floppy disk drive, a compact disc (CD) drive, a Flash memory (NAND and NOR types, including multiple bits per cell), a ferroelectric RAM (FRAM), or a polymer FRAM (PFRAM) or any other existing or future memory device for mass storage of information. Memory control hub 140 controls the operations of main memory 120, volatile storage cache device 150, non-volatile storage cache device 160 and mass storage device 170. Finally, a number of input/output devices 180 such as a keyboard, mouse and/or display may be coupled to bus 130.

Although volatile storage cache device 150 is illustrated as separate from main memory 120, other embodiments may have volatile cache storage device 150 as a part of main memory 120. The embodiments of the invention are not limited in this respect.

Although system 100 is illustrated as a system with a single processor, other embodiments may be implemented with multiple processors, in which additional processors may be coupled to the bus 130. In such cases, each additional processor may share the volatile storage cache device 150 and main memory 120 for writing data and/or instructions to and reading data and/or instructions from the same. Also, although non-volatile storage cache device 160 is shown external to mass storage device 170, in other embodiments non-volatile storage cache device 160 may be internally implemented into any non-volatile media in a system. For example, in one embodiment, non-volatile storage cache device 160 may be a portion of mass storage device 170. The embodiments of the invention are not limited in this respect.

Because retrieving data from mass storage device 170 can be slow, caching may be achieved by storing data recently accessed from the mass storage device 170 in a faster access storage medium, for example, volatile storage cache device 150 or non-volatile storage cache device 160. In one embodiment of the invention, non-volatile storage cache device 160 is much larger than volatile storage cache device 150. As such, only metadata and data currently in use is stored in volatile storage cache device 150 while all cached data and metadata is stored in non-volatile storage cache device 160. The next time cache data is needed, appropriate metadata is retrieved from volatile storage cache device 150 and used to retrieve cache line data from non-volatile storage cache device 160, thereby avoiding a time-consuming search and fetch in mass storage device 170. The cache devices may also be used for writing. In particular, metadata and data may be written to volatile storage cache device 150 at high speed and then stored until the data is written to non-volatile storage cache device 160, where it is preserved until the data can be written to mass storage device 170, for example, during idle machine cycles or idle cycles in a mass storage subsystem.

During system operation, for example, application execution, metadata is stored in non-volatile storage cache device 160 in a distributed format as described below. During proper system shutdown procedures, the metadata is stored in non-volatile storage cache device 160 in a packed format as described below.

Non-volatile storage cache device 160 preserves the cache line data and metadata for quick cache restoration upon system boot. If a system was shut down properly, upon reboot, packed metadata stored in non-volatile storage cache device 160 may be copied quickly to volatile storage cache device 150. If a system was not shut down properly, the cache state is preserved in the distributed format in non-volatile storage cache device 160 and may be still be copied, albeit more slowly, to volatile storage cache device 150.

Figure 2:
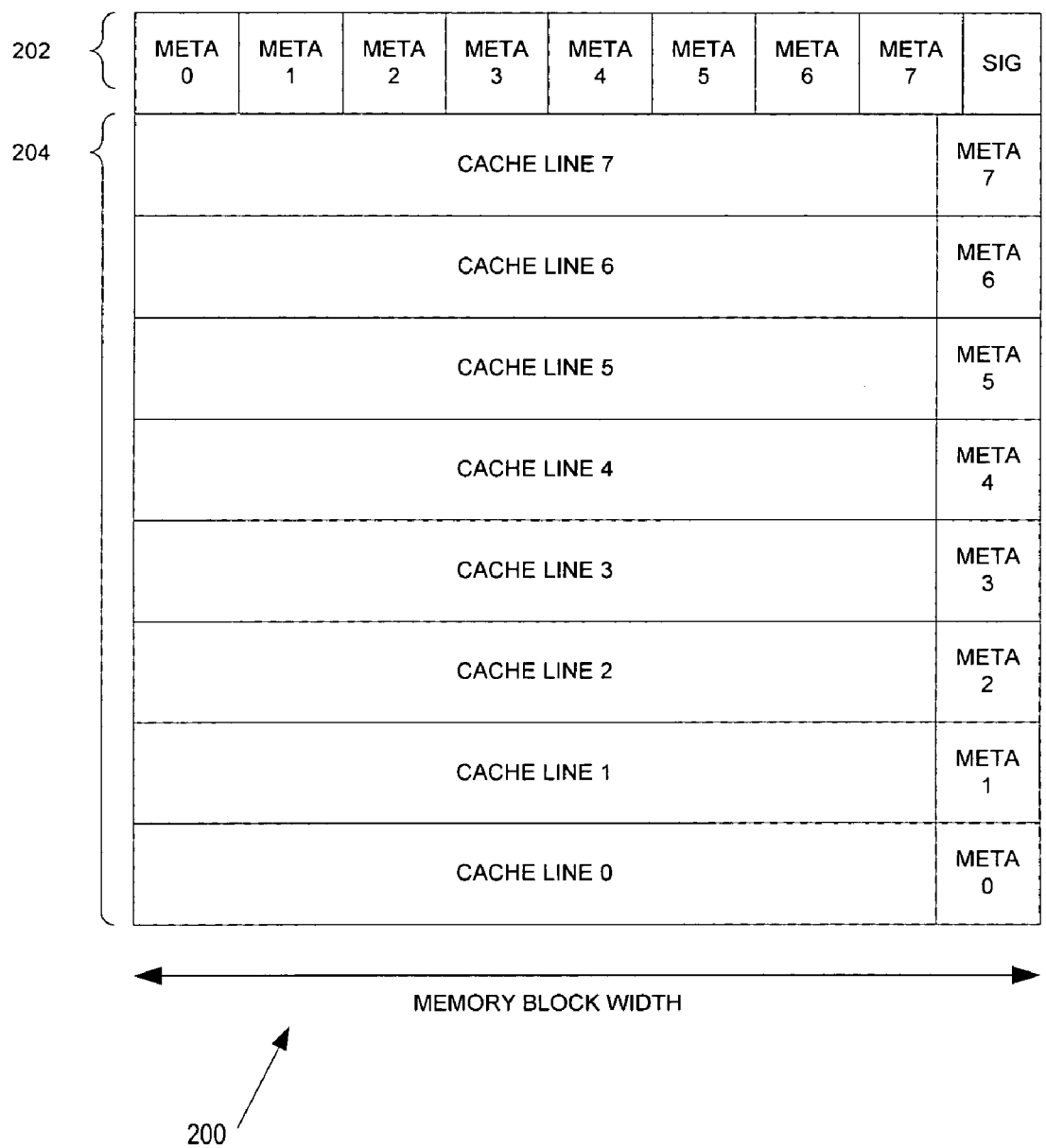
FIG. 2 illustrates a layout of a non-volatile storage media according to an embodiment of the invention.

FIG. 2 illustrates a layout of a non-volatile storage media according to an embodiment of the present invention. Non-volatile storage media 200 includes a packed metadata area 202, illustrated as a single block of memory, and a distributed metadata area 204, illustrated as eight blocks of memory. Packed metadata area 202 contains metadata 0-7 stored in a packed format such that multiple metadata, each associated with a different cache line, are stored adjacent to each other. Packed metadata area 202 also contains an integrity signature. The integrity signature protects against corrupt data structures due to an unexpected system shutdown. The packed metadata format allows multiple metadata to be accessed in an atomic operation because a single block of memory may be accessed in a single operation. In distributed metadata area 204, metadata 0-7 is stored in a distributed format, each of metadata 0-7 stored adjacent to its associated cache line, cache lines 0-7, respectively. The distributed metadata allows a cache line and its associated metadata to be updated in an atomic operation.

In the illustrated embodiment, each cache line and its associated metadata are contained within a separate memory block. Although one might view the cache lines as adjacent to each other in distributed metadata area 204, herein "adjacent to" refers to contained within a particular memory block. For example, cache line 2 is not adjacent to cache line 1 or cache line 3 in distributed metadata area 204 and metadata 2 is not adjacent to metadata 1 or metadata 3 in distributed metadata area 204. Cache line 2 is only adjacent to metadata 2 stored within the same block of memory. This arrangement ensures that a cache line and its associated data may be accessed in a single atomic operation.

As illustrated, non-volatile media 200 includes 9 blocks of memory. To restore volatile memory when metadata is only stored in a distributed format requires all memory blocks to be accessed. Restoring volatile memory with packed metadata as illustrated in non-volatile media 200 realizes an 8× savings over restoring volatile memory with distributed metadata. In alternate embodiments, non-volatile memories may include 64k or more blocks of memory and packed metadata area 202 may include significantly more metadata, providing for significantly faster boot times. Further, packed metadata area 202 may include multiple blocks of memory, as needed. The size of the packed metadata area or the distributed metadata area is not intended to be limited to this illustration.

Figure 3:
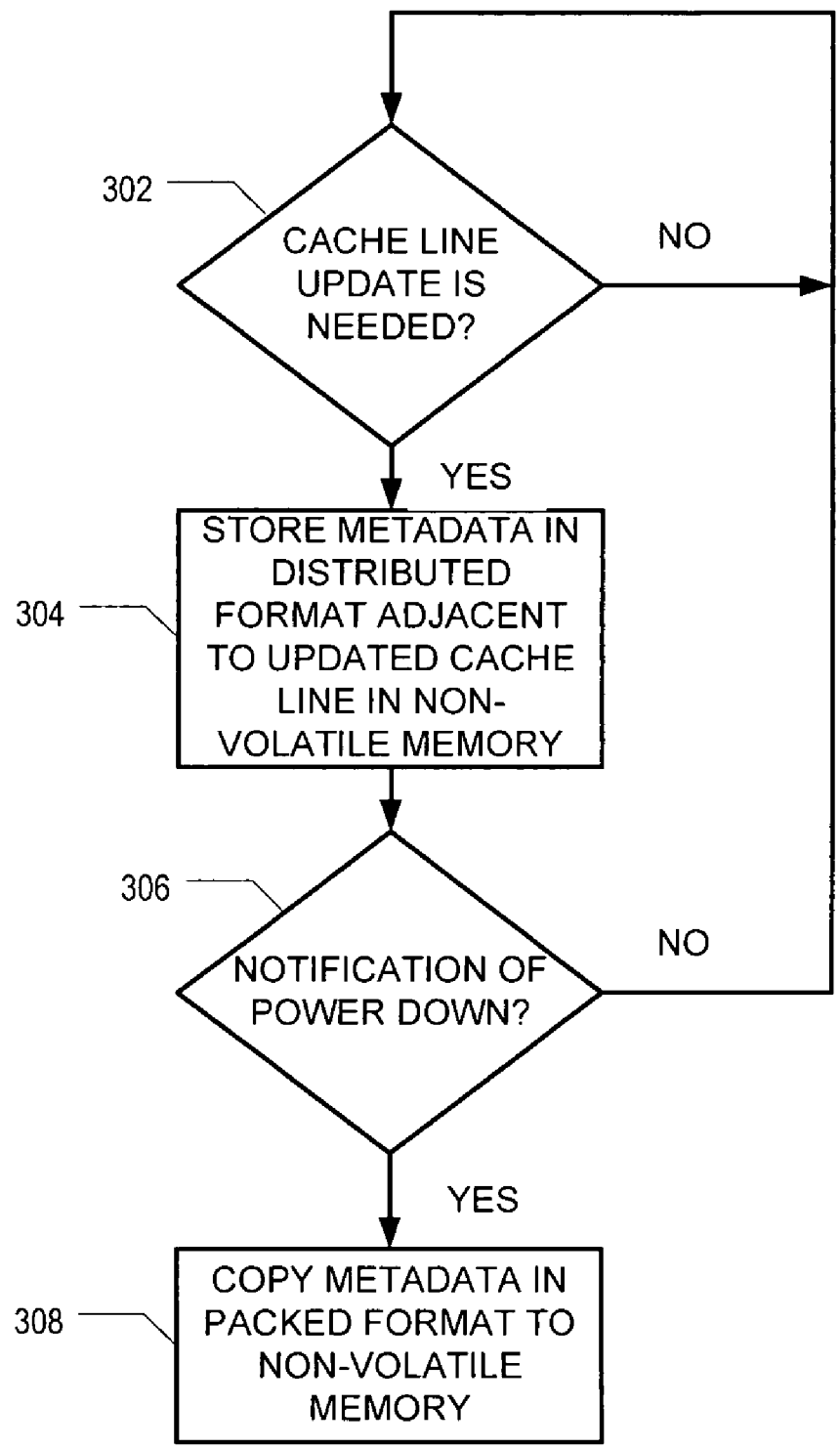
FIG. 3 illustrates a flow diagram of metadata storage according to an embodiment of the invention.

FIG. 3 illustrates a flow diagram of metadata storage according to an embodiment of the present invention. Referring to FIG. 3, a determination is made whether data has been updated in volatile cache and should be copied to non-volatile cache, block 302. If so, the cache line and associated metadata are retrieved from volatile memory and stored in non-volatile cache, block 304. The metadata is stored adjacent to the cache line in a distributed format, allowing the metadata and cache line to be updated in an atomic operation. A determination is made whether a notification of power down is received, block 306. The power down referred to here is an expected power down, for example, upon a user or application shutting a system down allowing applications to close cleanly and saving necessary data. If such notification is received, metadata is copied from volatile memory and stored in non-volatile memory in a packed format, block 308.

Figure 4:
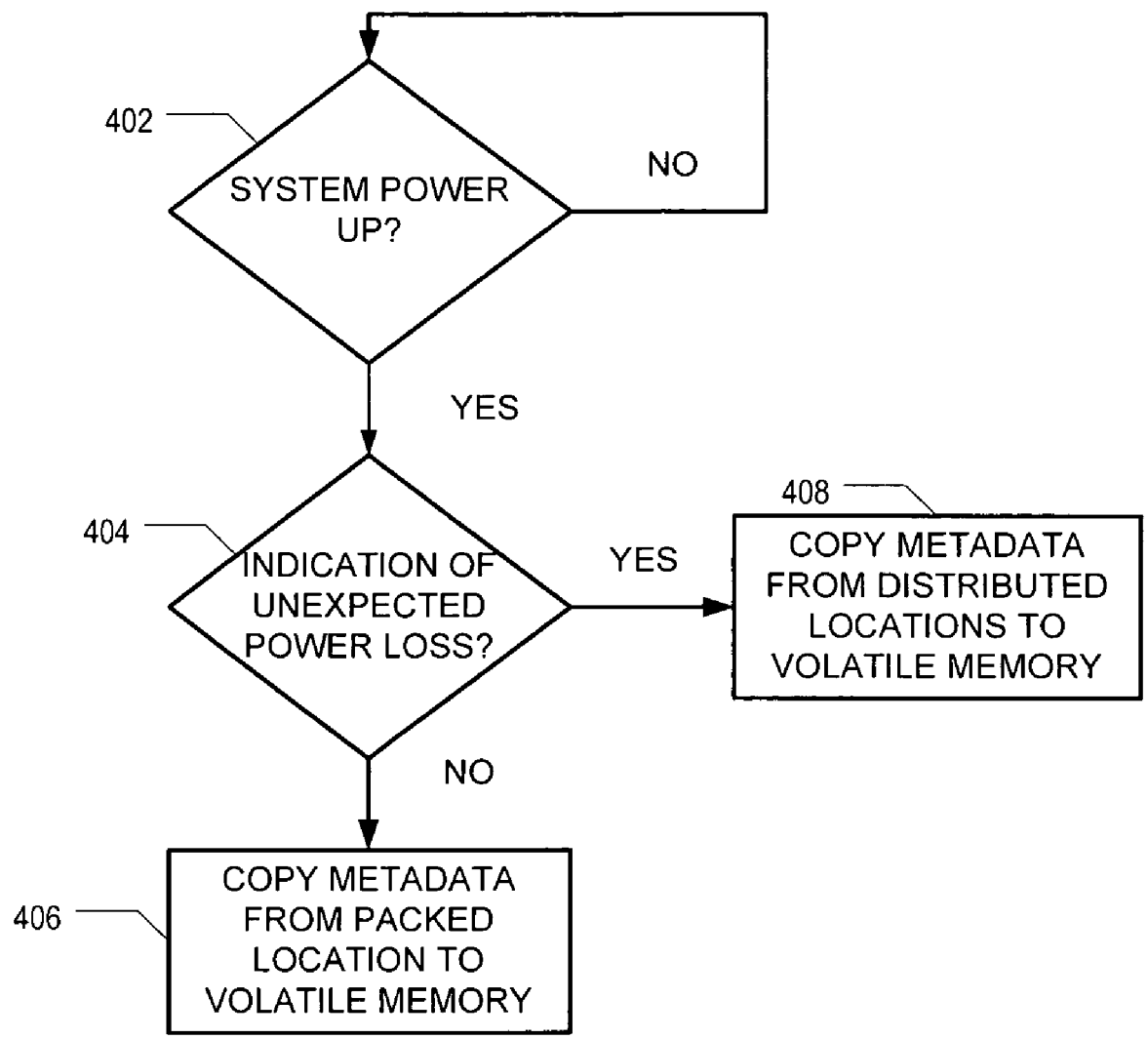
FIG. 4 illustrates a flow diagram of metadata retrieval according to an embodiment of the invention.

FIG. 4 illustrates a flow diagram of metadata retrieval according to an embodiment of the present invention. A determination is made whether a system has powered up, block 402. At system power up, metadata needs to be updated in volatile memory. A determination is made whether the system was shut down expectedly or unexpectedly, block 404. This determination may include checking an integrity signature in a packed metadata area in non-volatile memory. An expected power loss may include a user or application causing the system to shut down, for example, allowing the system to save any unsaved data, store metadata in a packed format in non-volatile memory. An unexpected power loss may include a sudden loss of AC power, for example, due to an electrical storm, disconnection of power source/battery and the like. In an unexpected power loss, a system would not have time to store metadata from volatile memory to non-volatile memory in a packed format and give a proper integrity signature. If the determination indicates the previous system shut down was expected, metadata is copied in a packed format from non-volatile memory, for example, packed metadata area 202, block 406. If the determination indicates the previous system shut down was unexpected, only the distributed metadata is available and thus the metadata is copied in a distributed format from non-volatile memory, block 408.

Flow 300 and 400 may be performed by disk cache software, system software, dedicated hardware in a memory controller or mass storage device, and the like. The embodiments are not limited in this respect.

Finally, although the invention has been discussed with reference to a cache memory device, the teachings of the invention can be applied to other memory devices storing data and state data. Accordingly, the foregoing embodiments are merely examples and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method comprising:
   storing a metadata and a cache line together in a single block of memory during an update of the cache line, the metadata associated with the cache line;
   storing the metadata and another metadata together during a system shutdown operation, the other metadata associated with another cache line; and
   copying the metadata and the other metadata from non-volatile storage to volatile storage during a system initialization operation.

2. The method as recited in claim 1, wherein the storing the metadata and the cache line together comprises storing the metadata and the cache line in non-volatile storage.

3. The method as recited in claim 1, wherein the storing the metadata and the other metadata together comprises storing the metadata and the other metadata in non-volatile storage.

4. The method as recited in claim 3, wherein a disk cache includes the non-volatile storage.

5. The method as recited in claim 1, wherein storing the metadata and the cache line together comprises storing the metadata with the cache line during an atomic operation.

6. The method as recited in claim 1, wherein storing the metadata with the other metadata comprises storing the metadata with the other metadata in a single block of memory.

7. The method as recited in claim 1, wherein storing the metadata with the other metadata comprises storing the metadata with the other metadata during an atomic operation.

8. The method as recited in claim 1, further comprising storing the metadata in volatile memory during the update of the cache line.

9. A method comprising:
   copying a plurality of metadata, each of the plurality of metadata associated with a different cache line, from a non-volatile memory to a volatile memory during a system initialization operation;
   wherein if an indication of an unexpected power down is detected, the copying the plurality of metadata comprises copying the plurality of metadata from a plurality of distributed storage locations in which each of the plurality of metadata is stored with its associated cache line; and
   wherein if an indication of an expected power down is detected, the copying the plurality of metadata comprises copying the plurality of metadata from a packed storage location in which the plurality of metadata are stored in a packed format in a single storage location.

10. The method as recited in claim 9, wherein the indication of an expected power down comprises a valid integrity signature stored with the plurality of metadata stored in the packed format.

11. The method as recited in claim 9, wherein each of the plurality of distributed storage locations comprises a block of memory.

12. An apparatus comprising:
   a memory controller configured to store a metadata and a cache line together in a single block of memory during an update of the cache line, the metadata associated with the cache line; and the memory controller further configured to store the metadata and another metadata together during a system shutdown operation, the other metadata associated with another cache line, the memory controller further configured to copy the metadata and the other metadata from non-volatile storage to volatile storage during a system initialization operation.

13. The apparatus as recited in claim 12, wherein to store the metadata and the cache line together the memory controller is configured to store the metadata and the cache line in non-volatile storage.

14. The apparatus as recited in claim 12, wherein to store the metadata and the other metadata together the memory controller is configured to store the metadata and the other metadata in non-volatile storage.

15. The apparatus as recited in claim 14, wherein a disk cache includes the non-volatile storage.

16. The apparatus as recited in claim 12, wherein to store the metadata and the cache line together the memory controller is configured to store the metadata with the cache line during an atomic operation.

17. The apparatus as recited in claim 12, wherein to store the metadata with the other metadata the memory controller is configured to store the metadata with the other metadata in a single block of memory.

18. The apparatus as recited in claim 12, wherein to store the metadata with the other metadata the memory controller is configured to store the metadata with the other metadata during an atomic operation.

19. The apparatus as recited in claim 12, the memory controller further configured to store the metadata in volatile memory during the update of the cache line.

20. A system comprising:
a volatile memory;
a non-volatile memory; and
a memory controller coupled to the volatile memory and the non-volatile memory, the memory controller configured to store a metadata and a cache line together during an update of the cache line, the metadata associated with the cache line; the memory controller further configured to store the metadata and another metadata together during a system shutdown operation, the other metadata associated with another cache line; and the memory controller further configured to copy the metadata and the other metadata from the non-volatile storage to the volatile storage during a system initialization operation.

21. The system as recited in claim 20, wherein to store the metadata and the cache line together the memory controller is configured to store the metadata and the cache line in the non-volatile memory.

22. The system as recited in claim 20, wherein to store the metadata and the other metadata together the memory controller is configured to store the metadata and the other metadata in the non-volatile memory.

23. The system as recited in claim 22, wherein a disk cache includes the non-volatile memory.

24. The system as recited in claim 20, wherein the memory controller is further configured to:
determine if an integrity signature is valid;
if the integrity signature is valid, copy the metadata stored in a packed format; and
if the integrity signature is invalid, copy the metadata stored in a distributed format.

25. The system as recited in claim 20, the memory controller further configured to store the metadata in volatile memory during the update of the cache line.

* * * * *